March 1, 1938.  E. F. HURD  2,109,619
MACHINE FOR PAINTING BARRELS
Filed March 23, 1934  5 Sheets-Sheet 1

INVENTOR
Edward F. Hurd
BY
Wooster & Davis
ATTORNEYS.

March 1, 1938. E. F. HURD 2,109,619
MACHINE FOR PAINTING BARRELS
Filed March 23, 1934  5 Sheets-Sheet 3
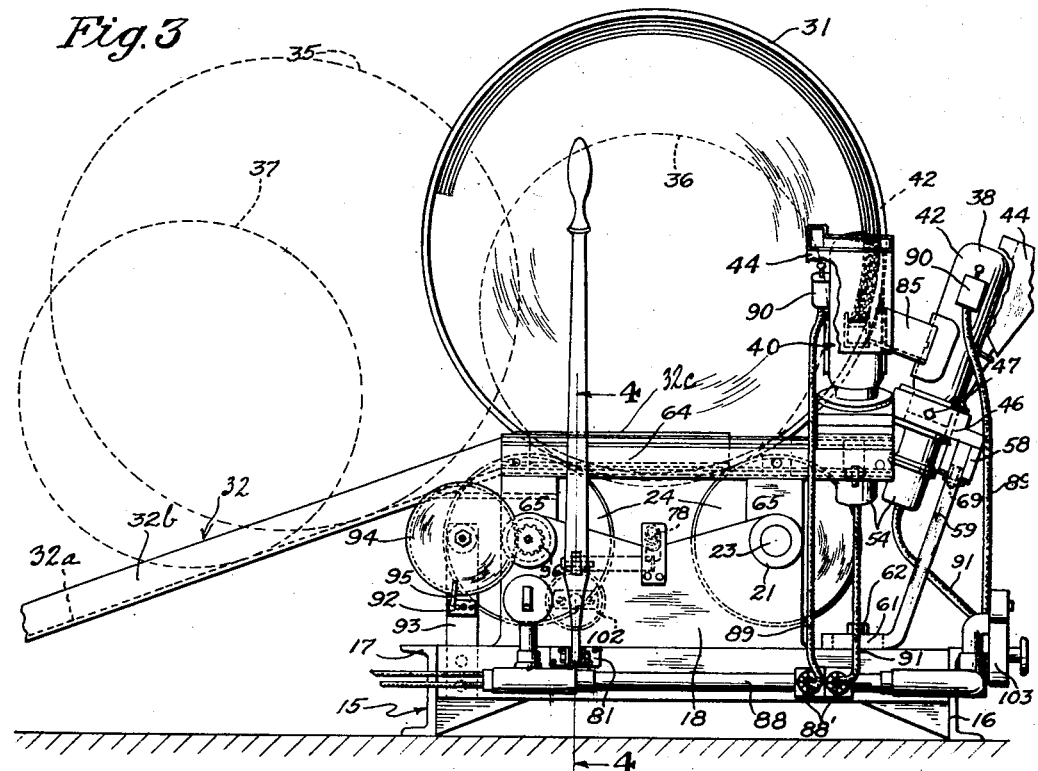
Fig. 3
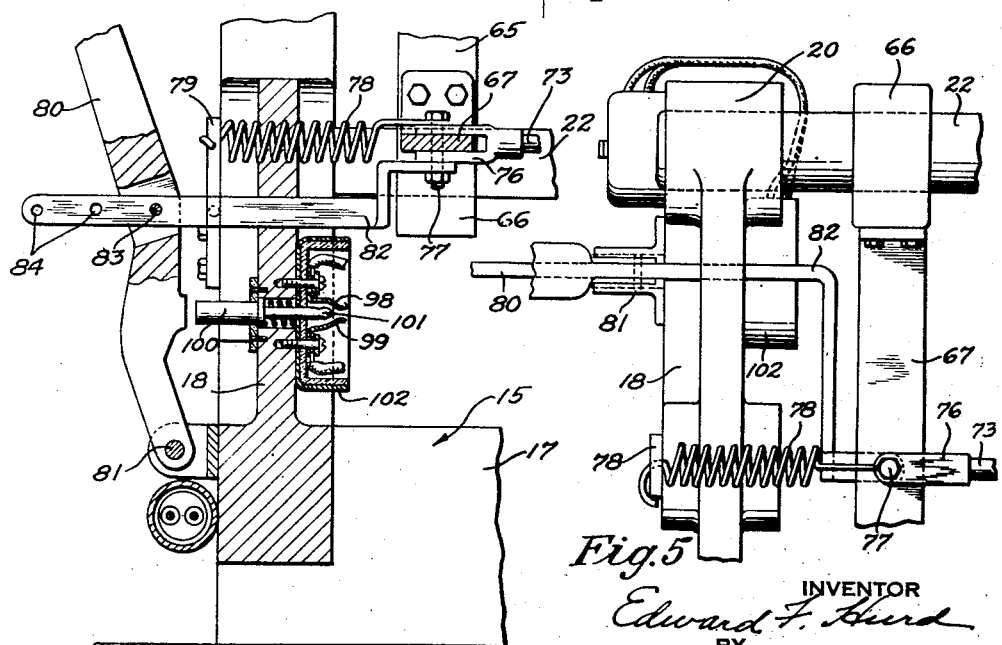
Fig. 4
Fig. 5
INVENTOR
Edward F. Hurd
BY
Wooster & Davis
ATTORNEYS

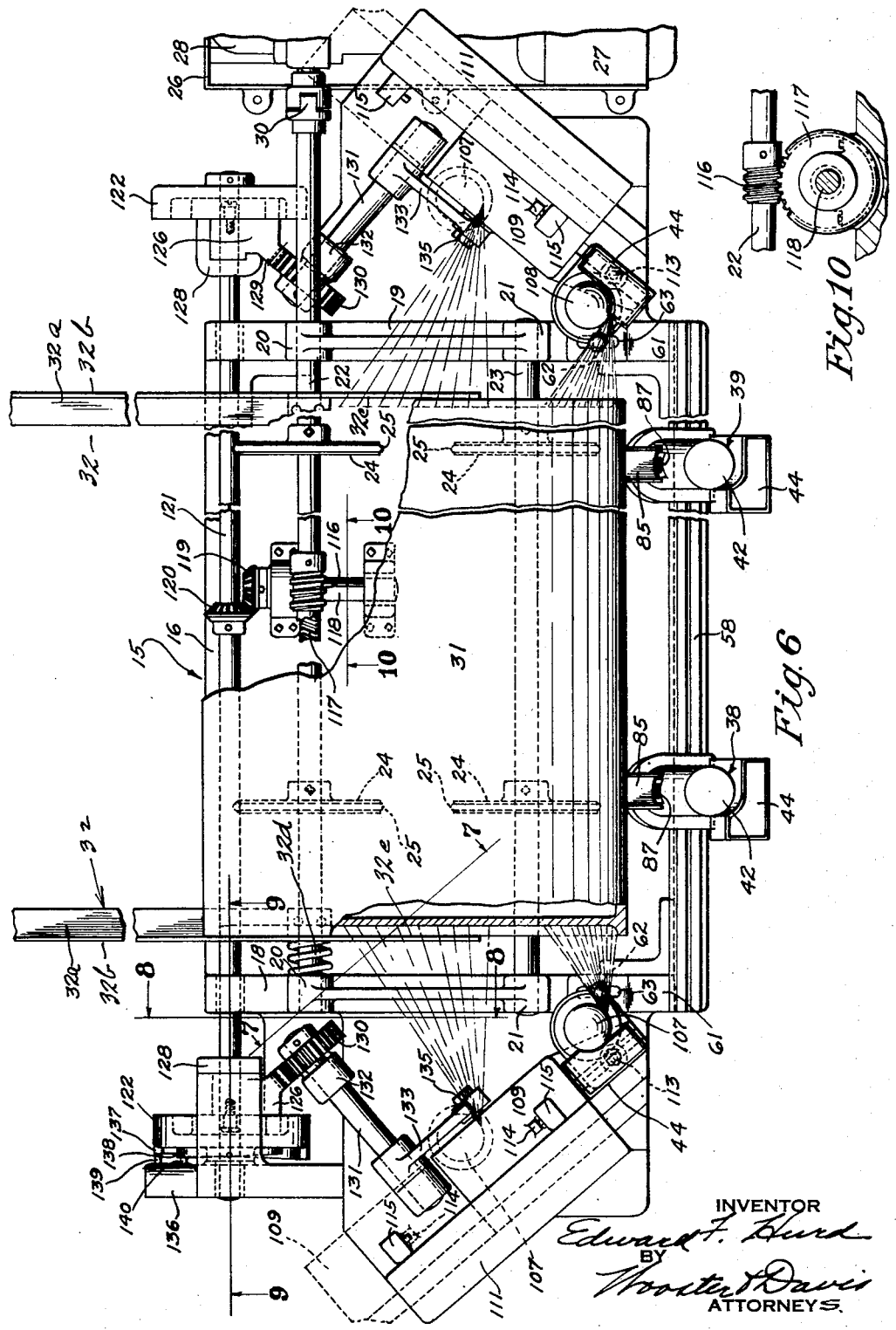

March 1, 1938. E. F. HURD 2,109,619
MACHINE FOR PAINTING BARRELS
Filed March 23, 1934 5 Sheets-Sheet 5
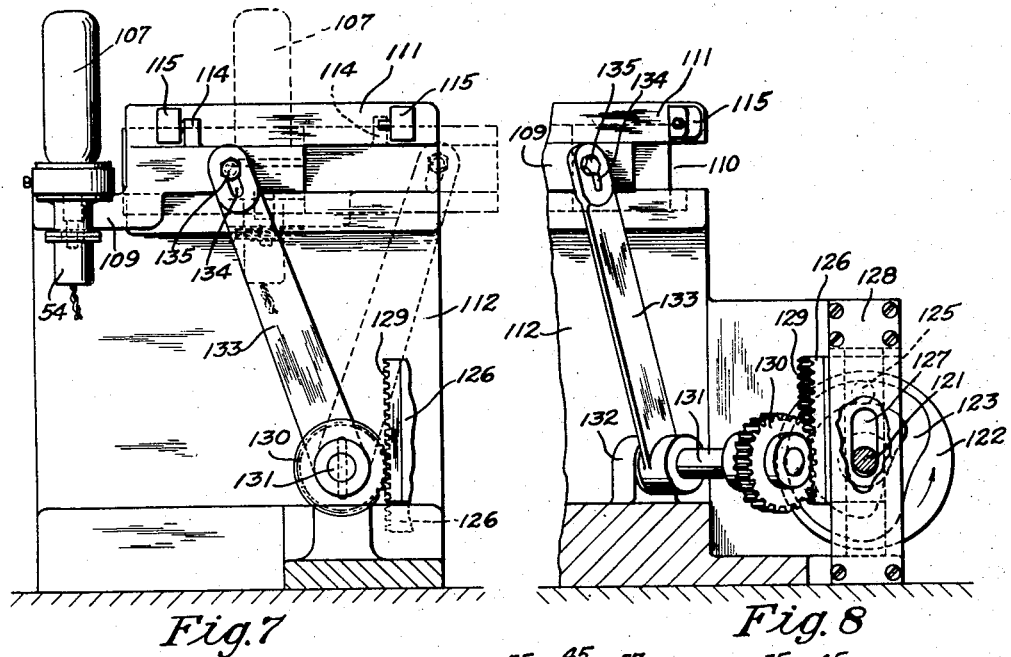
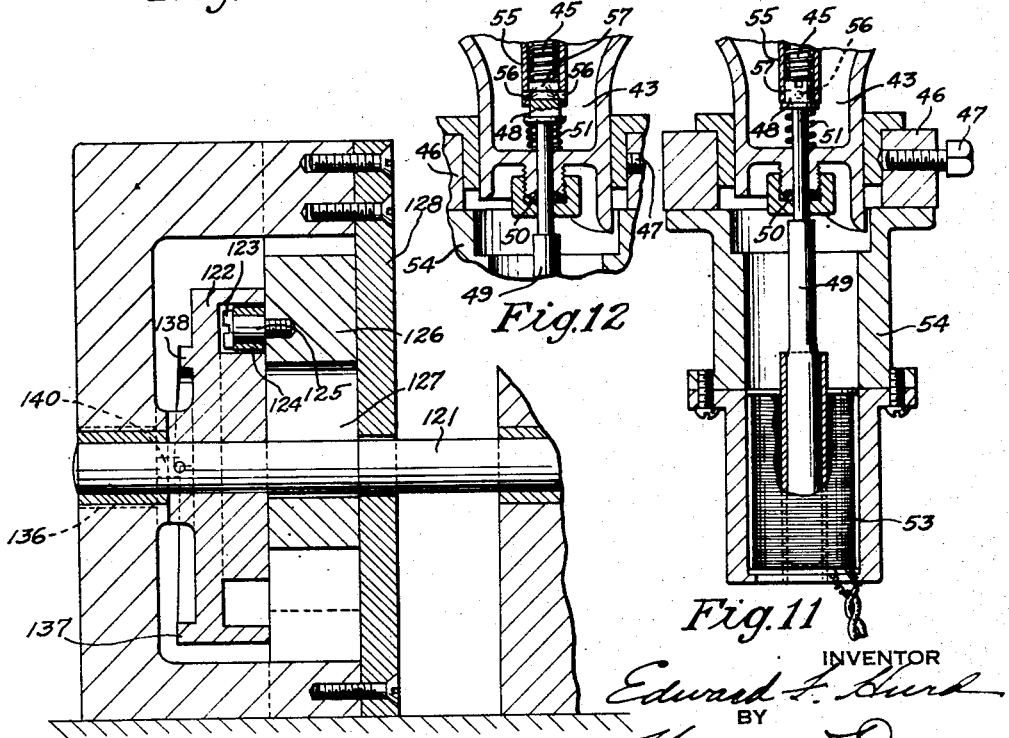

Patented Mar. 1, 1938

2,109,619

UNITED STATES PATENT OFFICE 2,109,619

MACHINE FOR PAINTING BARRELS

Edward F. Hurd, Bridgeport, Conn.

Application March 23, 1934, Serial No. 717,031

14 Claims. (Cl. 91—44)

This invention relates to new and useful improvements in painting machines and has particular relation to a painting or striping machine particularly adapted for operation on barrels, kegs, drums or other cylindrical articles, such for example as pipes.

An object of the invention is to provide a painting machine as indicated and which is substantially automatic in operation, it being only necessary for an operator to place the barrel, keg, drum or other article in the machine and start it, the desired operation being then carried out automatically by the machine and the machine being automatically stopped at the completion of the operation.

Another object is to provide a machine as indicated and which may be set to completely cover an article, as a barrel, keg or drum, with paint, or to place one or more paint stripes on the sides and ends or an end of the article, or to paint or stripe only the ends or an end, or to paint or stripe only the sides of the article.

A further object is to provide a painting machine which is of simple and rugged construction, efficient and reliable in operation and which is easily adjusted to give the desired results, and into and from which the articles to be treated may be easily introduced and removed.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

Fig. 3 is an end elevational view of the machine with an end painting gun adjusted toward one side of the machine;

Fig. 4 is a sectional view taken substantially along the plane of the line 4—4 of Fig. 3;

Fig. 5 is a top plan view of the parts shown in Fig. 4;

Fig. 6 is a top plan view showing a slightly different arrangement to be used when the ends of a barrel, keg or drum are to be completely covered or coated;

Fig. 7 is a view taken substantially along the plane of the line 7—7 of Fig. 6;

Fig. 8 is a view taken substantially along the plane of the line 8—8 of Fig. 6;

Fig. 9 is a view taken substantially along the plane of the line 9—9 of Fig. 6;

Fig. 10 is a detail sectional view taken substantially along the plane of the line 10—10 of Fig. 6;

Fig. 11 is a sectional view through the lower end portion of a painting gun, showing a solenoid controlled valve therein in closed position; and Fig. 12 is a somewhat similar view showing the valve open.

Figure 1:
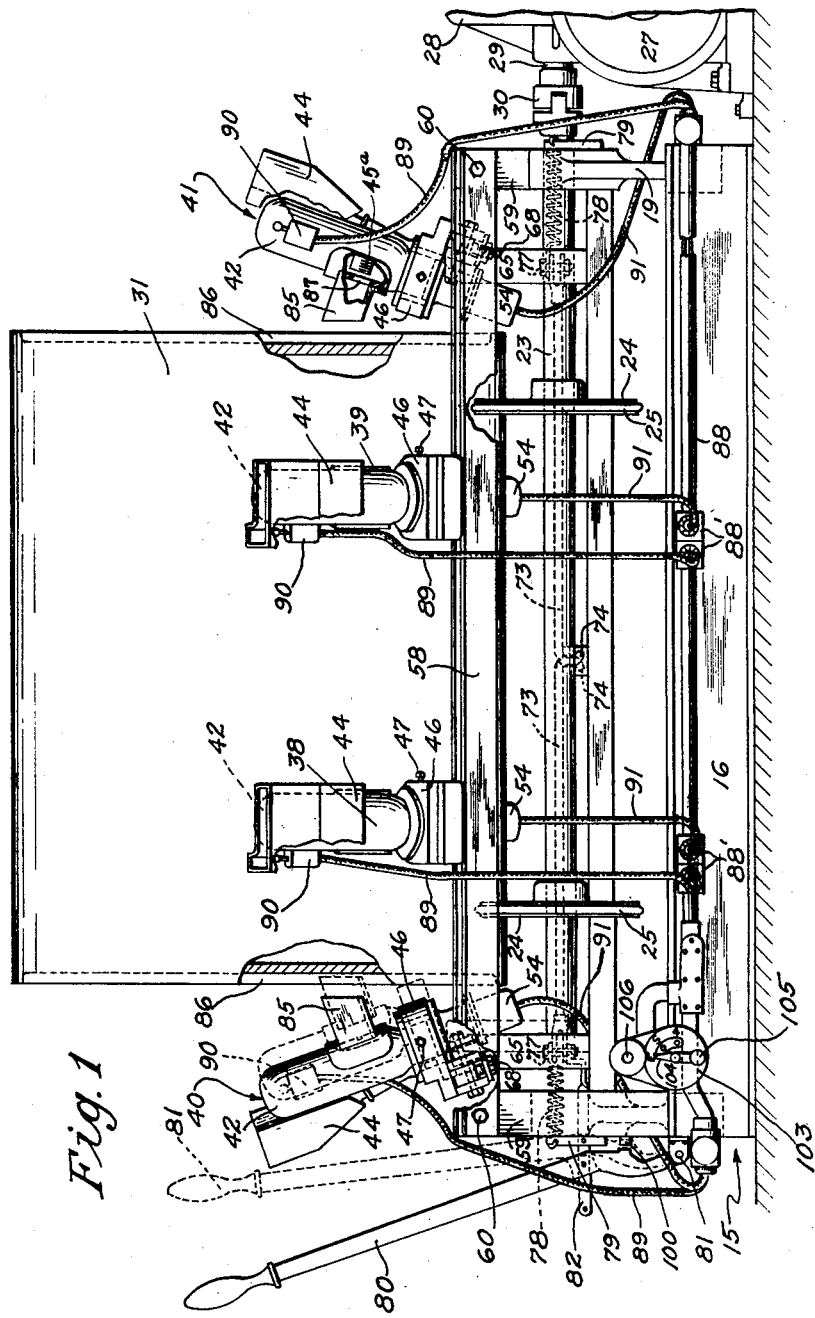
Fig. 1 is a side elevational view showing a machine constructed according to the present invention.

Referring in detail to the drawings, the improved machine as here disclosed includes a base or frame 15 on which the operating parts are mounted. As shown, base 15 is rectangular including side bars or members 16 and 17 and end members 18 and 19 all suitably connected to form a substantial and rigid frame. End members 18 and 19 are each provided or each include a pair of bearings 20 and 21 and extending lengthwise of the machine and supported at its end portions by the bearings 20 is a shaft 22 while a similar shaft 23 extends parallel with and in spaced relation to the shaft 22 and at its ends is received in the bearings 21 of the end members 18 and 19.

To each of the shafts 22 and 23 there is secured a pair of discs or wheels 24, the discs on the respective shafts being spaced apart and the discs on one shaft being preferably arranged opposite or substantially in alignment with those on the other shaft although not necessarily so, and they may be adjustable along the shaft for properly locating the same. Each disc is preferably equipped on its periphery with a tire or tirelike covering 25 of rubber or other similar friction means to form a support for the article to be painted and having only a point or line contact therewith and other purposes which will later more fully appear. In the case of heavy or filled barrels this rim is preferably of steel so it will not flatten as rubber would. The rim may be round or beveled to make minimum track in the paint and also to permit flow in of the paint after removal of the barrel to obliterate the mark or track. The shafts are rotatable in their respective bearings and while the shaft 23 is freely rotatable the shaft 22 is driven. To this end a base or mounting 26 may be arranged at one end of the frame 15 and such base carries a motor 27 which through suitable gearing (not shown) preferably a worm and gear drive within the gear casing or housing 28 drives a shaft 29 connected as by a coupling 30 with the shaft 22. With this arrangement the shaft 22 may be driven by the motor 27. There may be a larger disc at each end of the barrel on one of the shafts to act as end guides to keep barrel in proper position.

The wheels or discs 24 are arranged and function to support a barrel, keg or drum or other cylindrical article on its side in position for painting and to rotate such article while it is being painted. In the drawings, a drum 31 is shown supported on the disc 24 in position for painting, and to facilitate placing of the articles in the machine and removal of the articles from the machine a platform in the form of a pair of tracks 32 is provided. At their inner ends the tracks 32 may be supported by any suitable means such as on blocks 33 in turn mounted on the shaft 22 and at their outer ends such tracks rest on the floor or are supported on any suitable support. The discs 24 extend slightly above the tracks 32 so as to support a cylindrical article free of said tracks as illustrated in Figure 3. This figure also illustrates by the dotted lines 35 the manner in which an article is rolled from the tracks onto the discs or vice-versa and the figure also illustrates by the dotted line 36 how a smaller cylindrical article may be supported by the disc. At 37 this said smaller article is shown positioned on the tracks 32 either before being placed on the discs or after having been removed therefrom. These tracks may be of angle members and so spaced the barrel rests or rolls near its ends on the horizontal flanges 32a which extend toward each other while the upright flanges 32b by engaging the ends of the barrel guide it to proper position relative to the paint guns. The inner end of flange 32a is cut off to permit the barrel to drop onto the discs 24 while the flanges 32b are extended as shown at 32c adjacent the ends of the barrel and keep it in proper position. One of the tracks 32 may be movable with a spring 32d on the shaft 22 tending to press against the end of the barrel and retain the barrel against the other or stationary track. This will allow for the slight variations in the lengths of the barrels.

When a cylindrical article is supported on the disc or wheels 24 and the shaft 22 is being driven such supported article will be rotated and while it is being rotated it is painted. According to the present invention the painting operation may comprise the striping or the fully covering of either or both ends of the cylindrical article, as a barrel, keg, drum or the like, or the operation may comprise placing one or more stripes on the side of the article or fully covering the side of the article, or the operation may comprise any combination of these treatments as the striping or fully coating of one or both ends of the article together with the striping or coating of the sides of the article. Also, various painting jobs may be done with various colors of paint as desired.

The guns used in the painting operation may be of any suitable type such as the pneumatic, or the electric or mechanical type, and as here shown two guns 38 and 39 are mounted at the side of the machine opposite the tracks 32, and it will be understood that a greater or lesser number of such guns may be used. Guns 40 and 41 are shown arranged one at each end of the machine although obviously more than one gun could be arranged at each end of the machine when found desirable as when the ends of an article are to be painted with a number of stripes of different colors. All the guns illustrated are of the electric type although as stated above other types may be used and comprise a type of gun now on the market and including an electric motor 42 the lower portion of the casing of which constitutes a reservoir or container 43 (see Figs. 11 and 12) to which paint is supplied from containers or receptacles 44, and from which container 43 the paint is drawn by a lifting screw 45 for discharge in the form of a flat spray by a rotating distributer 45a (Fig. 1). The commercial gun includes adjustments whereby the spray or "shot" may be from one-half inch to eighteen inches in width and is usually about one-half inch thick.

Each gun is disclosed as including a mounting bracket or means 46 in which the gun proper may be turned or rotated so as to control the direction of the discharge of paint by the gun. A set screw 47 or other means may be used for securing the gun in the desired adjusted position in the bracket 46, and as will be clear from Figs. 11 and 12 on loosening of such screw the gun may be turned and on tightening of the screw the gun will be secured in the desired position. Controlling the passage of paint from the reservoir 43 to the pump 45 is a valve 48 carried by a stem 49 extending through the lower end of the reservoir 43 and through a stuffing box or other sealing means 50. A coil spring 51 is arranged about the valve stem 49 within the reservoir 43 and tends normally to seat or close said valve. Any suitable means may be provided for operating and controlling this valve. Thus for example the lower end portion 52 of the valve stem may be enlarged as shown and comprise the core of a solenoid 53 arranged within the lower portion of an extension 54 of each gun.

The lower end of the casing 55 of the pump 45 is provided in its opposite sides with holes 56 and the upper end of the valve 48 is slotted at 57. When the valve is closed, as shown in Fig. 11, its slot 57 is above the openings 56 and the latter are closed. On the solenoid 53 being energized the valve is drawn downwardly to the position of Fig. 12 and its notch or slot is registering with the openings 56 in the pump casing and the valve being open the pump will take paint from the reservoir 43 provided the motor 42 of the gun is operating. The valve may, however, be controlled and operated by any other suitable means such as a mechanical or hydraulic mechanism.

However, when the valve 48 is seated or closed the gun motor may remain in operation and the gun will not discharge paint. This valve arrangement is provided in order that the motors of the guns may be kept constantly in operation during the time an article is being removed from the machine and another article placed thereon. With this arrangement the gun motors will be operating at full speed, the instant the valves 48 are opened and a uniform spray will be obtained. The valve may be omitted, and the pump motors 42 started and stopped at the beginning and end of each operation, but I have found that as they will have to pick up speed at the beginning of the operation this requires a little time and while they are gathering speed the pumps will not give their proper uniform spray. This is not objectionable in some classes of work but in painting metal drums where there is not absorption of the paint this may cause a too thick daub of paint at the beginning of the operation. As indicated above, however, this is obviated by keeping the motor and distributer running at operating speed and controlling the feed of paint by the valve.

The guns 38 and 39 at the side of the machine are mounted on a support or rail 58 supported at its ends by uprights 59 to which it is bolted at 60. These uprights each include a foot portion 61 bolted to the end of the frame members 18 and 19 respectively as shown at 62. In order that the rail 58 may be adjusted toward and from the shaft 23 to adapt the machine for operation on different diameters of articles the foot pieces 61 are provided with slots 63 through which the bolts 62 extend, and as viewed in Fig. 2 it will be apparent that on loosening of the bolts 62 the rail 58 may be adjusted either toward or from the shaft 23 so as to position the guns 38 and 39 for operation on either smaller or larger articles than the article 31 shown in place on the machine.

The end paint guns 40 and 41 are mounted on and adjustable along similar supporting rails 64. These rails 64 are supported on short uprights 65, the lower end portions of which are attached to or formed with bearing-like members or portions 66 mounted on and slidable along the shafts 22 and 23. Portions 66 at the respective ends of the machine are tied together by straps or cross pieces 67 whereby at each end of the machine there is a frame-like structure comprising a rail 64, verticals 65, bearing-like portions 66 and a strap 67. Of these elements or portions the rails 64 have the end guns 40 and 41 mounted on them, and the guns are adjustable along the rails. The said frame-like structures at the respective ends of the machine are movable toward and from one another, being supported and guided by the shafts 22 and 23.

It will be understood that the end guns may be turned or adjusted in their brackets 46 on loosening of the set screws 47 as above described. Further, on loosening of the bolts 68 the end guns may be shifted along the rails 64 to any desired position and after an adjustment has been made the bolts are again tightened to secure the guns in adjusted position. Similar bolts 69 (see Fig. 3) secure the guns 38 and 39 in desired adjusted positions on the rail 58. A central member 70 extends longitudinally of the frame and at its ends may be secured to the end members 18 and 19 of the frame. Pivotally mounted on member 70, as for example on a stud 71 carried by said member, is a cross arm 72 to the outer ends of which are connected the inner ends of rods 73. As disclosed, these rods have their inner ends bent to form hooks 74 which hooks are passed through openings 75 in the end portions of the cross arm.

At their outer ends, the rods 73 carry bifurcated members 76 (see Figs. 4 and 5) which members receive the cross straps 67 of the end frame-like structures above referred to and are connected with such straps as by bolts 77. A coil spring 78 is arranged at each end of the machine and the respective springs have their inner end portions secured as by the bolts 77 and have their outer end portions anchored to straps or other means 79 secured to the end members of the frame. With this arrangement it will be clear that the coil springs 78 constantly tend to shift the end frame-like structures, including the gun mounting rails 64, in directions away from one another or toward the ends of the machine, that is away from the ends of the article supported in painting position, the parts being shown in their normal positions by the full lines in Fig. 2.

A hand lever 80 has its lower end pivotally attached to the end frame member 18 as at 81 and a strap 82 connected at one end to one of the rods 73 by a bolt 77 has its other end portion connected with the lever 80 as by a bolt 83. This other end portion of strap 82 is provided with a series of perforations or holes 84 whereby the strap may be adjustably connected with the lever by the bolt 83. With the described structure on lever 80 being forced in the direction of the machine the strap 82 will be moved inwardly of the machine with the result that the rod 73 connected with said strap will also be shifted inwardly to rock the cross arm 72 on its pivot in a manner to draw the other rod 73 inwardly of the machine. That is, the parts are shifted from their full line position of Fig. 2 to the dotted line position of that figure and this shifting movement includes an inward movement of the end frame structures including the gun mounting rails 64. Obviously, since inward rocking movement of the lever 80 draws the gun mounting rails and guns toward one another outward movement of the lever will have the opposite effect and will result in the returning of the guns to their normal positions.

When the sides or ends or both of a barrel or other cylindrical article are to be painted only to the extent of striping, the guns are each provided with a substantially U-shaped shield 85. These shields serve to prevent spreading of the spray as it progresses away from the gun and with the shields in place the guns are adjusted to dispose the shields very close to the surface to be striped so that the stripe as painted on the article will have a sharp well defined edge. When an entire side surface of an article is to be covered with paint the shields of the guns 38 and 39 will be removed and the guns so adjusted relatively that each will be in a position to spray one-half the surface. This, of course, will necessitate proper positioning of the guns on the rail 58 and will require adjustment of the guns so as to have them give a spray of the desired width.

Figure 2:
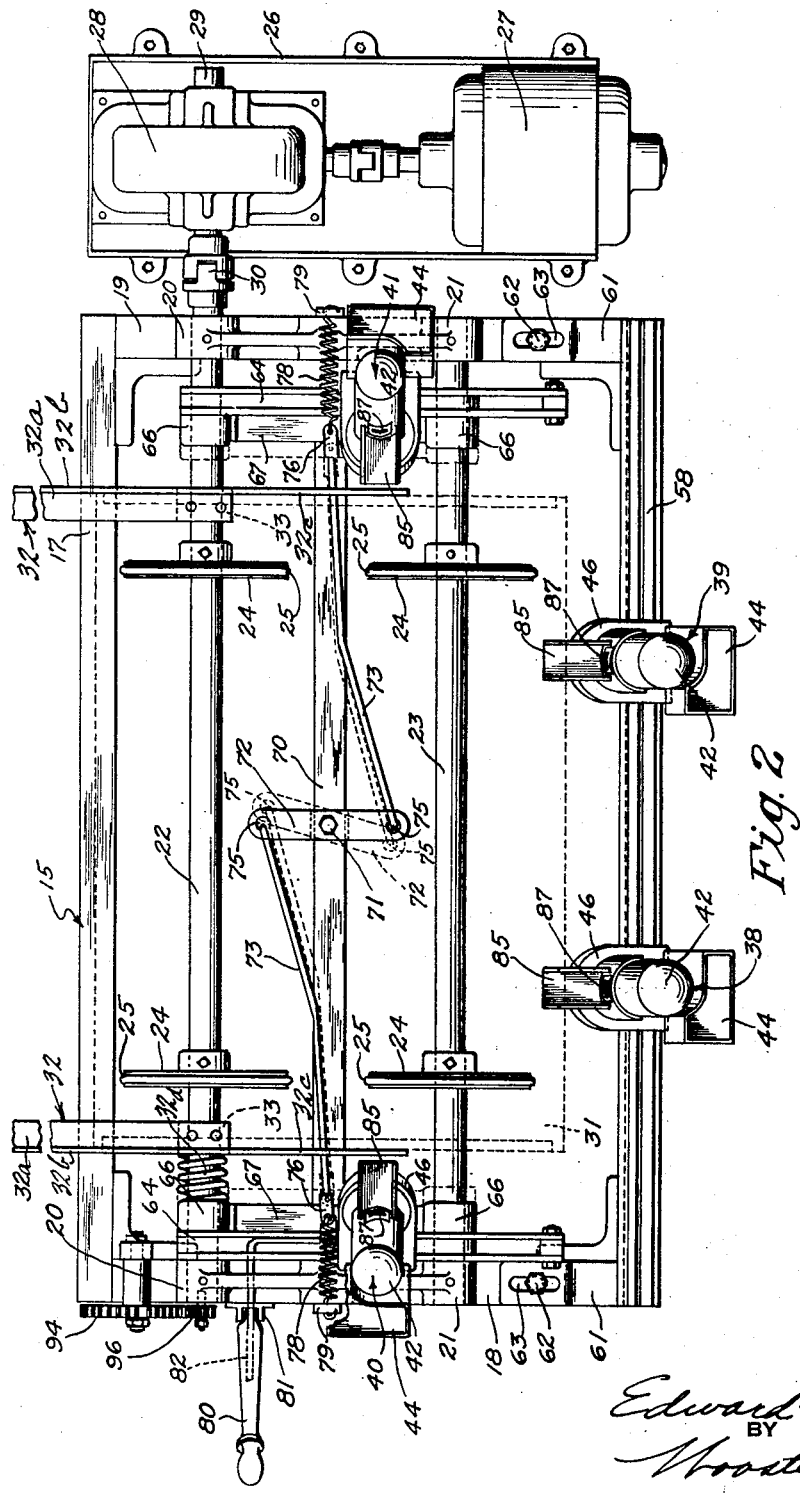
Fig. 2 is a top plan view of the machine.

Similarly, the ends of the article may be fully covered by the end guns on removal of their shields 85 although when the end guns are arranged as shown in Figs. 1, 2 and 3, they are more particularly useful for striping the ends of the article, since if their spray is made wide enough to extend from the center to the edge of the end of the article the central portion of the article end, moving at less linear speed than the portion near the periphery due to change in radius, will be too heavily coated. A particular arrangement for fully coating or covering the ends of articles with a uniform coating is disclosed in Figs. 6 through 10 and will later be fully described.

In striping the ends of a barrel, the guns 40 and 41 are adjusted to make the stripe of the desired width, and when the article is in place the lever 80 is operated to draw the end guns toward one another so as to dispose their shields close to the ends of the article. This adjustment disposes the ends of the shields within the chime portion 86 of the article as shown to the left in Fig. 1 and locates the shields 85 close to the ends of the article. When the stripes have been painted, lever 80 is released or drawn outwardly to shift the guns outwardly to have the shield clear the chimes 86 of the article after which the latter may be rolled off the machine.

The means for shifting the end guns as described is desired since unless the shields 85 are disposed closely adjacent the surface being painted the stripes may not be accurately controlled to have them well defined. The guns may not be permanently positioned since otherwise it would be impossible to roll the article 31 onto the machine as its chime portions would engage the shields of the guns. The slots 63 and bolts 62 provide for adjustment of the side guns 38 and 39 toward the article so as to dispose the shields of such guns close to the sides of the article. Surplus paint collected by the shields 85 flows downwardly along their bottom walls, (the shields being inclined as clearly shown in Figs. 1 and 3) and into the reservoirs 43 through the lower part of the opening 87 provided in the gun casings through which the rotating distributer throws the paint.

An electric conduit 88 may extend about three sides of the machine having suitable receptacle outlets 88', and each gun has its motor connected with such conduit through a cable or conductor 89 connected with a switch 90 arranged on the gun casing, each cable having a cap to plug into the outlets 88'. The solenoids 53 controlling the valves 48 of the respective guns are connected to the conduit as by cables 91 and similar plug caps. A switch 92 controlling the circuit to the motor 27 is suitably located as on an upright 93 and this switch is adapted to be automatically opened to open the circuit to the motor at a predetermined time, as when the article 31 has made a complete revolution. To this end, a gear 94 is provided with a tripping finger 95 to engage and throw the switch (preferably a snap switch) at the proper time and such gear 94 is driven as by a relatively small gear 96 mounted on an end of the shaft 22. As shaft 22 is driven it drives the gear 96 and the latter drives the gear 94 and as the finger 95 on gear 94 comes into position it operates the switch handle to open the switch and stop the motor 27. The overrun of the machine is such that when the finger 95 trips the switch 92 the finger will be carried by the switch leaving the latter free to be closed manually when the next barrel or other cylindrical article is placed in the machine. This automatic cut off is preferably used only when the end guns are not used or are not shifted as will now be described.

With the switches 90 closed the motors of the paint guns may be in operation while the valves 48 are closed so that the guns will not be spraying paint. The solenoids 53 of these guns may be in circuit with a pair of spaced contacts 98 and 99 and when the lever 80 is moved inwardly it will engage a plunger 100 and force a contact 101, carried by such plunger, into a position between and closing the circuit through said contacts 98 and 99. When this occurs, the shields of the guns will be closely adjacent the work and the gun motors will be operating at full speed so that when the valves are opened and the pumps begin to spray paint it will be sprayed in a uniform manner. As the lever 80 is returned to normal position either manually or by the springs 78 the circuit will be opened at the contacts 98 and 99, the solenoids 53 will be deenergized and coil springs 51 will expand and close or seat the valves 48 cutting off the further supply of paint to the pump of the gun. As disclosed, contacts 98 and 99 are arranged within and insulated from a housing 102. With this arrangement for shifting the end guns toward and from the ends of the article being painted it is preferred to also control the drive motor 27 through the switch 98, 99 so that when the article is in place operation of lever 80 to shift the end guns to operative position will start the motor 27 to start the article rotating and at the same time start the paint guns operating. When a complete revolution of the article is made the operator can either shift the lever 80 outwardly and stop the discharge of paint and rotation of the article, or by merely releasing this lever the springs 78 will accomplish the same result. Or if preferred the automatic cut out and switch 95, 92 can be used in conjunction with switch 98, 99 so the motor 27 and the guns are started operating by shifting of hand lever 80 and automatically stopped at the end of a complete revolution of the article being painted by operation of automatic trip 95 opening switch 92.

As an added refinement selector switch means 103 may be provided if desired, and the same includes control contacts adapted to be selectively engaged by a bridging piece whose position is indicated by pointer 104 having an operating handle 105. With the pointer at "E" the motors of the end guns 40 and 41 will be in closed circuits while the circuits to the side guns will be opened. When said pointer is at "S" the circuits to the motors of the side guns 38 and 39 will be closed while the circuits to the end guns will be opened. If pointer 104 is at "4" the circuits to all of the gun motors will be closed. From this it will be understood that any selected guns may be placed in or out of operation by proper setting of the switch 103. A push button switch 106 is provided for setting the machine in operation when testing the machine or the like.

Assuming the parts to be in their normal positions if it is desired to entirely coat or to stripe the sides only of any article, the latter is rolled onto the discs 24 and switch 92 is operated to start the motor and the switch 103 is set on the contact "S". The operator may then operate the lever 80 to close the circuit between contacts 98 and 99 whereupon side guns 38 and 39 will go into operation and spray the paint on the sides of the rotating article, or the guns also may be controlled by the switch which controls motor 27. At the end of a revolution of article 31 or at other proper or predetermined time gear carried finger 95 will trip the switch 92 and stop the motor 27, and also the guns if they are controlled by the same switch. The operation of the mechanism will be the same whether the sides of the article are being covered or only striped. The end guns under these conditions will not be in operation since their motors will not be operating.

If it is desired to paint only the ends of the article, then the switch 103 would be set to contact "E" and the remainder of the operation would be the same as described for painting the sides of the article. To paint both the sides and ends of the article, the operation would likewise be the same except that the switch 103 would be placed on the contact "4". When the ends of the article are being painted operation of lever 80 automatically moves the guns up close to the ends of the article simultaneously closing the circuit to the solenoids 53 by moving the contact finger 101 into engagement with the spring contacts 98 and 99. Should it be desired, to use only one of the end guns or only one of the side guns the guns not to be used may be placed out of operation by opening of their switches 90.

Figs. 6 through 10 disclose a structure particularly adapted for use when the ends of the article 31 are to be completely covered as distinguished from being merely striped. In these figures the frame and article supporting and rotating means are the same as previously described and the side guns 38 and 39 are the same and are mounted the same as the side guns of the form of the invention first described. In Figs. 6 through 10 the end guns are designated 107 and 108 and are each mounted for movement during the painting or spraying operation toward or from the end of the article and in a path inclined relative thereto. The mounting for each end gun includes a slide 109 slidably mounted in a slot 110 in a head-like portion 111 of an upright 112. The guns may be secured to the slides as by bolts 113 and each slide carries an upstanding lug 114 operating between a pair of stops 115 positively limiting movement of the slide in either direction. It will be noted the slides are inclined to the end of the article being painted, the preferred angle being in the neighborhood of 35°.

Means are provided for automatically shifting the slides 109 back and forth in the slots 110 and this means includes a worm 116 secured to the shaft 22 and meshing with and driving a worm gear 117 on a short shaft 118 which short shaft at its outer end carries a beveled gear 119 meshing with and driving a beveled gear 120 secured to a shaft 121 mounted in the frame 15 and extending beyond each end thereof and arranged substantially parallel with the shaft 22. On each of its end portions shaft 121 carries a cam 122 having a cam groove 123 therein receiving a roller 124 disposed on a stud 125 carried by a block 126. These blocks 126 each have a slot 127 therein accommodating the shaft 121 and providing means whereby the blocks may be moved upwardly and downwardly free of the shaft, by the cam as the latter is rotated. Any suitable bracket means 128 may be utilized to support and guide the blocks 126 during movement of the latter by the cams.

On one edge each block 126 is provided with rack teeth 129 and such teeth mesh with a gear 130 suitably secured to a shaft 131 arranged at an incline to the end member 18 of the frame 15 but arranged normal to the plane of the head 111. Shafts 131 are mounted in bearings 132 and secured to each shaft is a lever arm 133, the upper end of which is slotted as at 134 for the accommodation of a bolt 135 used to secure the upper end of said arm to the slide 109. One end of the shaft 121 is mounted in a wall 136 which wall may be an extension of one of the uprights 112, and the cam 122 on this end of the shaft is provided on its rear face with cam rings 137 and 138 adapted to operate switch buttons 139 and 140 respectively at the proper times.

It is noted that the heads 111 mounting the slides 109 are arranged at an incline relative to the end frame members 18 and 19 of the machine and relative to the ends of the barrel or other cylindrical article 31 shown on the machine. Preferably, as indicated above, the angular incline between the article ends to be painted and the slides 109 is in the neighborhood of 35° as it has been found this applies a more uniform coating to the end of a barrel, for example.

Assuming the parts to be in the full line positions in which they are shown in Fig. 6, should the machine be started, the article 31 will be rotated and the end guns will begin to spray paint against the ends of the article adjacent the edges thereof. As the machine operates the shaft 121 is driven and through the cams 122 operates the blocks 126 to have their rack teeth 129 rotate the gears 130 and the latter through the shafts 131 swings the arms or levers 133. As the levers are swung as from the left toward the right in Fig. 7 the slides 109 are shifted with the result that the paint guns are moved along the heads 111 at an angle or at an incline to the ends of the article 31 as suggested by the broken lines in Figs. 6 and 7. It will be noted that as the guns come into position to spray the central portions of the ends of the article the width of the spray at its point of engagement with the article has very substantially increased so that as the rate of feed of paint for the entire spray remains the same the coating or amount of paint per unit of area decreases as the width of the spray increases and vice versa.

Therefore as the width of the spray as it is applied to the ends of the article is considerably greater when the gun is farthest from the article, it is used at this time to paint the central portion of the barrel which is moving at a slower speed than the portions near the outer periphery. Also, as adjacent the edges of the article the linear speed of movement of the surface with respect to the spray is relatively high this portion of the end surface is painted when the gun is nearer to it and consequently it is painted by the narrower portion of the spray in which the amount of paint per unit of area is greater. Therefore, as the gun is gradually moved away from the end surface as it is moved radially to apply the paint from the rim inwardly toward the center the paint is applied much more evenly over the whole end surface. The operation is reversed in painting from the center toward the periphery. Therefore, to prevent the application of an unduly heavy coat of paint to the center portion of the article it is desirable to move the gun away from said end of the article as the gun is moved from the edge toward the center thereof or to move the gun toward the article as the gun is moved from the center toward the edge thereof.

The angle of diversion or along which the gun should be moved is preferably in the neighborhood of 35°. When a rack 129 reaches the end of its movement in one direction its slide 109 will have been shifted to bring its lug 114 into engagement with one of the stops 115 and either the cam ring 137 or the cam ring 138 will have tripped one of the switches 139 or 140 to open the circuit to the motor 27 and if desired open the circuits to the paint guns or to the solenoids 53 controlling the valves 48 of the paint guns.

The painted barrel is then removed from the machine and another barrel substituted, it being noted that at this time the parts including the paint guns will be located substantially in the positions in which they are shown in dotted lines in Figs. 6 and 7. When the next barrel is on the machine the machine is again started and the end guns begin to spray the central portions of the ends of the article 31. The cams 122 having operated the blocks 126 and racks 129 carried thereby a complete stroke in one direction start to operate the blocks and racks in the opposite direction with the result that the gears 130 and shafts 131 will be operated to reverse the movement of levers 133 and carry the slides 109 outwardly or toward the edges of the article ends from the center thereof. In other words, the ends of one article are painted by beginning to spray such ends adjacent their edge portions and working inwardly toward their center portions and the ends of the next article are painted by beginning to spray their central portions and gradually working out to their edge portions.

From the foregoing it will be understood that when stripes are to be painted on barrel the shields 85 are used and that when the entire surface of the barrel is to be covered such shields are removed. By adjusting the guns along their respective supporting rails stripes may be painted at desired intervals about the sides or on the ends of a cylindrical article and through the automatic means for tripping the switch 92 the machine is automatically stopped at any predetermined time, although ordinarily this means would operate to stop the machine at the end of one complete revolution of the article being painted. By the proper setting of the switch 103 the desired guns only will be placed in operation and owing to the employment of the valves 48 the motors of the various guns may be kept constantly in operation during the time a painted barrel is being removed from the machine and another barrel placed in the machine. This provides for a uniform spray from the guns as above described.

Also, the construction is such that the various guns may be adjusted so as to adapt the machine for operation on articles of various diameters, and it will be apparent that the different guns may be loaded or supplied with different colors of paints if such is desired. Frequently, these barrels are painted in various ways or with various stripes to identify them with particular manufacturers of the goods sold in the barrels or kegs or drums. While in the present description the machine is described as for use in painting it will be appreciated that the machine may be used for applying paint or enamel or any other desired coating or coloring matter to any cylindrical article either in a manner to fully cover the same or in the form of spaced stripes thereon. The various control means are such that the different guns are easily placed in or out of operation and push button 106 provides means for placing the machine in operation to test it, the control by this switch being such that the machine only operates while the switch is held closed. While the switching means within the housing 102 has been disclosed as controlling the circuits to the electric valves of the various guns it will be understood that such valves and in fact the motors of the various guns may also be controlled by the switch 92 controlling the driving motor 27.

Further, it will be understood that by the means disclosed in Figs. 6 through 10 the ends of a cylindrical article may be covered with a uniform coating of paint or the like. This means is such that the guns are automatically shifted so as to automatically position them to compensate for variations in the surface areas subjected to the paint spray as the guns are moved to direct the spray towards the central portions of the ends of the article or towards the edge portions of such ends. Since the guns are shifted away from the article as they are moved to direct their spray toward the centers of the ends of the article the spray widens out and the paint density becomes less as it moves toward the central portions of the ends of the article than while it is being directed against the edge portions of the ends of the articles. Thus it will be seen that the machine automatically compensates for the varying areas against which the spray is directed so that a uniform coating is obtained. When the ends of one article have been coated the machine is automatically stopped and then the guns have their movements reversed while painting the next article.

In the following claims the complete covering or the striping of an article is referred to as "coating" and it is to be understood that such term is used to designate either the complete covering or the striping of an article.

Also, I am not limited to using the particular type of paint gun shown but may use any suitable type. However, a gun of the general type shown is preferred as it does not require the use of a hood such as is required with air spray guns.

Having thus set forth the nature of my invention what I claim is:

1. In a machine for coating cylindrical articles such as barrels and the like, a frame, means on the frame to support a cylindrical article in position on its side, means to rotate said means to rotate the article, a support spaced from said first means, a paint gun mounted on said support in position to spray paint onto the article, and means operatively connected with the article rotating means to automatically stop rotation of said first means on said article completing one revolution.

2. In a machine for coating cylindrical articles such as barrels and the like, a frame, means on the frame to support a cylindrical article in position on its side, means to rotate said means to rotate the article, a support spaced from said first means, a paint gun mounted on said latter support in position to spray paint onto the article, manual means to start said support rotating means, and automatic means connected with the supporting means so as to be operated in timed relation therewith to stop rotation of the support at the end of a predetermined rotation of the article.

3. In a machine for coating cylindrical articles such as barrels and the like, a frame, means on the frame to support a cylindrical article in position on its side, an electric motor driving said means to rotate the article, a support spaced from the first means, a paint gun on said support in position to spray paint onto the article as the latter is rotated, a switch controlling the circuit to said motor, and automatic means operated from the article rotating means to open said switch after a predetermined rotation of the article.

4. In a machine for coating cylindrical articles such as barrels and the like, means to support an article in position on its side, an electric motor to rotate said means, a paint gun arranged to spray paint onto the article as it is rotated, said paint gun including a rotating paint distributer and an electric motor for operating it, a pump operated by said motor for spraying paint, a valve controlling the passage of paint to said rotating distributor, means for opening said valve, a spring for closing said valve whereby to prevent feeding of paint to said distributor without stopping the motor, and means for controlling said valve opening means in timed relation with the operation of the supporting means.

5. In a machine for coating cylindrical articles such as barrels and the like, means to support an article in position on its side, an electric motor to rotate said means, a paint gun arranged to spray paint onto an end of the article as it is rotated, said paint gun including a rotating paint distributer and an electric motor for operating it, a pump operated by said motor for spraying paint, a valve controlling the passage of paint to said rotating distributor, means for opening said valve, a spring for closing said valve whereby to prevent feeding of paint to said distributor without stopping the motor, means for moving said gun toward and from the end of the article, and means operated by said gun moving means to control said valve operating means as the gun is moved from and toward the end of the article.

6. In a machine for coating cylindrical articles such as barrels and the like, means to support an article in position on its side, means to rotate an article on said means, a paint gun at each end of the article supporting means in positions to spray paint onto the ends of the article, and a single means connected to both guns for simultaneously moving said paint guns toward and from the respective ends of the article.

7. In a machine for coating cylindrical articles such as barrels and the like, means to support an article in position on its side, means to rotate an article on said means, a paint gun at each end of the article supporting means in positions to spray paint onto the end of the article, a frame on each end portion of the article supporting means, each of said frames including a rail mounting one of said paint guns, means whereby said paint guns may be adjusted along the respective rails crosswise of the ends of the article, and means for shifting said frames toward and from each other to shift said guns toward and from the ends of the article.

8. In a machine for coating cylindrical articles such as barrels and the like, means to support an article in position on its side, means to rotate an article supported on said means, a support at an end of said article supporting means, said support arranged at an incline to an end of an article supported on said means and in closer relation to the edge portion of said end of the article than to the center thereof, means mounting a paint gun on said support in position to spray paint onto an end of an article and for movement along said support, and means for feeding the paint gun along said support in timed relation to the speed of rotation of the article on the article supporting means.

9. In a machine for coating cylindrical articles such as barrels and the like, means to support an article in position on its side, means to rotate an article supported on said means, a support at an end of said article supporting means, said support arranged at an incline to an end of an article supported on said means and in closer relation to the edge portion of said end of the article than to the center thereof, means mounting a paint gun on said support in position to spray paint onto an end of an article and for movement along said support, and means to feed said paint gun along said support first in one direction and then in the other whereby to have the gun spray an end of an article beginning at the edge of the article and working toward the center thereof while the gun moves in one direction and to spray an article beginning at the center thereof and working toward the edge thereof while the gun moves in the opposite direction.

10. In a machine for coating cylindrical articles such as barrels and the like, means to support an article in position on its side, means to rotate an article supported on said means, a support at an end of said article supporting means, said support arranged at an incline to an end of an article supported on said means and in closer relation to the edge portion of said end of the article than to the center thereof, means mounting a paint gun on said support in position to spray paint onto an end of an article and for movement along said support, means to feed said paint gun along said support first in one direction and then in the other whereby to have the gun spray an end of an article beginning at the edge of the article and working toward the center thereof while the gun moves in one direction and to spray an article beginning at the center thereof and working toward the edge thereof while the gun moves in the opposite direction, and means whereby said gun is fed in timed relation with the speed at which the article is rotated.

11. In a machine for coating cylindrical articles such as barrels and the like, means to support an article in position on its side, means to rotate an article supported on said means, a support at an end of said article supporting means, said support arranged at an incline to an end of an article supported on said means and in closer relation to the edge portion of said end of the article than to the center thereof, means mounting a paint gun on said support in position to spray paint onto an end of an article and for movement along said support, means to feed said paint gun along said support first in one direction and then in the other whereby to have the gun spray an end of an article beginning at the edge of the article and working toward the center thereof while the gun moves in one direction and to spray an article beginning at the center thereof and working toward the edge thereof while the gun moves in the opposite direction, and means for stopping the machine at the end of each movement of the gun along said support in one direction.

12. In a machine for coating cylindrical articles such as barrels and the like, means to support an article in position on its side, means to rotate an article supported on said means, a paint gun at one end of the article supporting means in position to discharge a substantially horizontal flat spray onto the outer surface of an end of an article supported on said means, means to feed said paint gun horizontally back and forth crosswise of the end of the article, and means whereby the paint gun is moved toward and from the end of the article as it is moved crosswise of the end of the article whereby to compensate for the different linear speeds of different areas of the end portion of the article.

13. In a machine for coating cylindrical articles such as barrels and the like, means to support an article in position on its side, means to rotate an article supported on said means, a paint gun at one end of the article supporting means in position to spray an article supported on said means, a support for the gun inclined to the axis of rotation of the article and closer to the outer edge of the end than the center thereof, means to shift said paint gun back and forth on said support crosswise of the end of the article, and means whereby said paint gun is fed in timed relation with the speed of rotation of the article.

14. In a machine for coating cylindrical articles such as barrels and the like, means to support an article in position on its side, means to rotate an article supported on said means, a support at an end of said article supporting means, said support arranged at an incline to an end of an article supported on said means and in closer relation to the edge portion of said end of the article than to the center thereof, a slide on said support, a paint gun on said slide, a shaft, means driving said shaft from the article rotating means, a cam on said shaft, a rack reciprocated by said cam, a gear meshing with said rack to be oscillated thereby, a shaft rigid with and mounting said gear, and a lever rigid with said gear and connected with said slide for shifting the same and said gun on said support crosswise of the end of the article as the gear and shaft are rocked by said rack.

EDWARD F. HURD.